US012730506B2

(12) United States Patent
Palacios et al.

(10) Patent No.: US 12,730,506 B2
(45) Date of Patent: Sep. 8, 2026

(54) SYSTEM AND METHOD FOR DELIVERING PERSONALIZED READING EXPERIENCE

(71) Applicant: Sony Interactive Entertainment Inc., Tokyo (JP)

(72) Inventors: Jorge Arroyo Palacios, San Mateo, CA (US); Steven Osman, San Mateo, CA (US); Tooba Ahsen, San Mateo, CA (US)

(73) Assignee: SONY INTERACTIVE ENTERTAINMENT INC, Tokyo (JP)

( * ) Notice: Subject to any disclaimer, the term of this patent is extended or adjusted under 35 U.S.C. 154(b) by 0 days.

(21) Appl. No.: 18/672,614

(22) Filed: May 23, 2024

(65) Prior Publication Data

US 2025/0362743 A1 Nov. 27, 2025

(51) Int. Cl.
*G06F 3/01* (2006.01)
*G06F 3/16* (2006.01)

(52) U.S. Cl.
CPC .............. *G06F 3/013* (2013.01); *G06F 3/165* (2013.01)

(58) Field of Classification Search
CPC ........................................................ G06F 3/013
See application file for complete search history.

(56) References Cited

U.S. PATENT DOCUMENTS 6,195,640 B1 * 2/2001 Mullaly .................. G06F 3/013 704/260
11,696,088 B1 * 7/2023 Douglas ................ G06F 16/437 381/310
12,135,931 B1 * 11/2024 Coskun ................. G06F 40/109
2012/0131491 A1 * 5/2012 Lee ......................... G06F 3/013 715/776
2015/0042552 A1 * 2/2015 Tsoref ..................... G06F 3/013 345/156
2015/0310651 A1 * 10/2015 Chandrasekaran ....... G06F 3/16 345/642
2016/0011657 A1 * 1/2016 Estacio ................... G06F 3/013 345/156
2016/0248721 A1 * 8/2016 Bastide ................... H04L 51/52
2017/0212583 A1 * 7/2017 Krasadakis ........... G06F 3/0482
2019/0206132 A1 * 7/2019 Zielkowski ............. G06F 3/011
2023/0024903 A1 * 1/2023 Hong .................... G06F 16/903
2023/0080085 A1 * 3/2023 Layton .................. G01C 21/30 340/425.5
2023/0400918 A1 * 12/2023 Francis ............... G06F 3/04886
2024/0103678 A1 * 3/2024 Dryer ...................... G06F 3/013
2024/0319789 A1 * 9/2024 Lozada .................. A61B 5/163
2024/0338173 A1 * 10/2024 Daryanani ............ G06F 11/324
2025/0047811 A1 * 2/2025 Desai ....................... H04N 7/15
2025/0093643 A1 * 3/2025 Francis ............... G06F 3/04842

* cited by examiner

*Primary Examiner* — Gene W Lee
(74) *Attorney, Agent, or Firm* — Kilpatrick Townsend Stockton LLP

(57) ABSTRACT

To ensure that individuals gain as much as they can from a piece of text by adapting the text according to their specific reading needs and behaviors, metrics such as the position of a reader's gaze, pupil dilation, squinting behavior, fixation durations etc., are used to adapt the text according to reader's reading needs or habits and improve the reading experience. Machine learning may be used for this.

18 Claims, 10 Drawing Sheets

700
Squinting?
Yes
702
Increase Text Size

SYSTEM AND METHOD FOR DELIVERING PERSONALIZED READING EXPERIENCE

FIELD

The present application relates generally to delivering personalized reading experiences.

BACKGROUND

As understood herein, different individuals have different reading behaviors and needs. For example, some individuals prefer to speed read, only taking in a few words in each line or on each page. Younger readers, or readers new to a language, may fixate on a word for longer periods of time, because they are unfamiliar with the word. Readers who are dyslexic may have trouble reading certain font styles (like serif fonts) because the shape of the letters are too stylized.

SUMMARY

Accordingly, an apparatus includes at least one processor system configured for receiving images from at least one camera representing eye tracking data of a person gazing at text on a display, and altering the text and/or at least one setting of the display responsive to the eye tracking data.

This may be accomplished by a rules-based system and/or by a machine learning (ML)-based system. In the latter example, the processor assembly can be configured for inputting the eye tracking data to at least one machine learning (ML) model, and receiving from the ML model an indication of the altering.

In non-limiting examples the eye tracking data indicates the person missed text, and the altering includes repeating the text missed by the person on the display.

In other examples the eye tracking data indicates the person missed text, and the altering includes simplifying the text missed by the person on the display.

In still other examples the eye tracking data indicates the person squinting, and the altering includes increasing a size of the text on the display.

In example embodiments the eye tracking data indicates the person re-read text, and the altering includes presenting a definition of the text re-read by the person.

In other embodiments the eye tracking data indicates the person re-read text, and the altering includes presenting a translation of the text re-read by the person.

In some implementations the eye tracking data indicates the person re-read text, and the altering includes presenting a pronunciation of the text re-read by the person.

In other implementations the eye tracking data indicates the person reads a first font better than a second font, and the altering includes switching presentation of the text from the first font to the second font.

In non-limiting embodiments the eye tracking data indicates the person focuses on a non-text element on the display, and the altering includes simplifying the text.

In other non-limiting embodiments the eye tracking data indicates the person focuses on a non-text element on the display, and the altering includes presenting additional non-text elements on the display.

If desired, the eye tracking data can indicate that the person focuses on a non-text element on the display, and the altering may include presenting a summary of the text adjacent the non-text element.

In example implementations the eye tracking data indicates the person is asleep, and the altering includes presenting a summary of the text.

In other example implementations the eye tracking data indicates the person lost track of a line of the text, and the altering includes rendering the line to be more prominent than other portions of the display.

In some example non-limiting embodiments the eye tracking data indicates the person is experiencing difficulty reading the text, and the altering includes playing an audible version of the text on at least one speaker.

In another aspect, a device includes at least one computer storage that is not a transitory signal and that in turn includes instructions executable by at least one processor system to receive from at least one camera an image of at least one of a person's eyes. The instructions also are executable to input data representing the image to at least one machine learning (ML) model, receive from the ML model at least one output, and based at least in part on the output, alter text on an electronic display.

In another aspect, a method includes generating eye tracking data of a person reading text on a display, and based at least in part on the eye tracking data, changing presentation of the text.

The details of the present application, both as to its structure and operation, can be best understood in reference to the accompanying drawings, in which like reference numerals refer to like parts, and in which:

DETAILED DESCRIPTION

Figure 1:
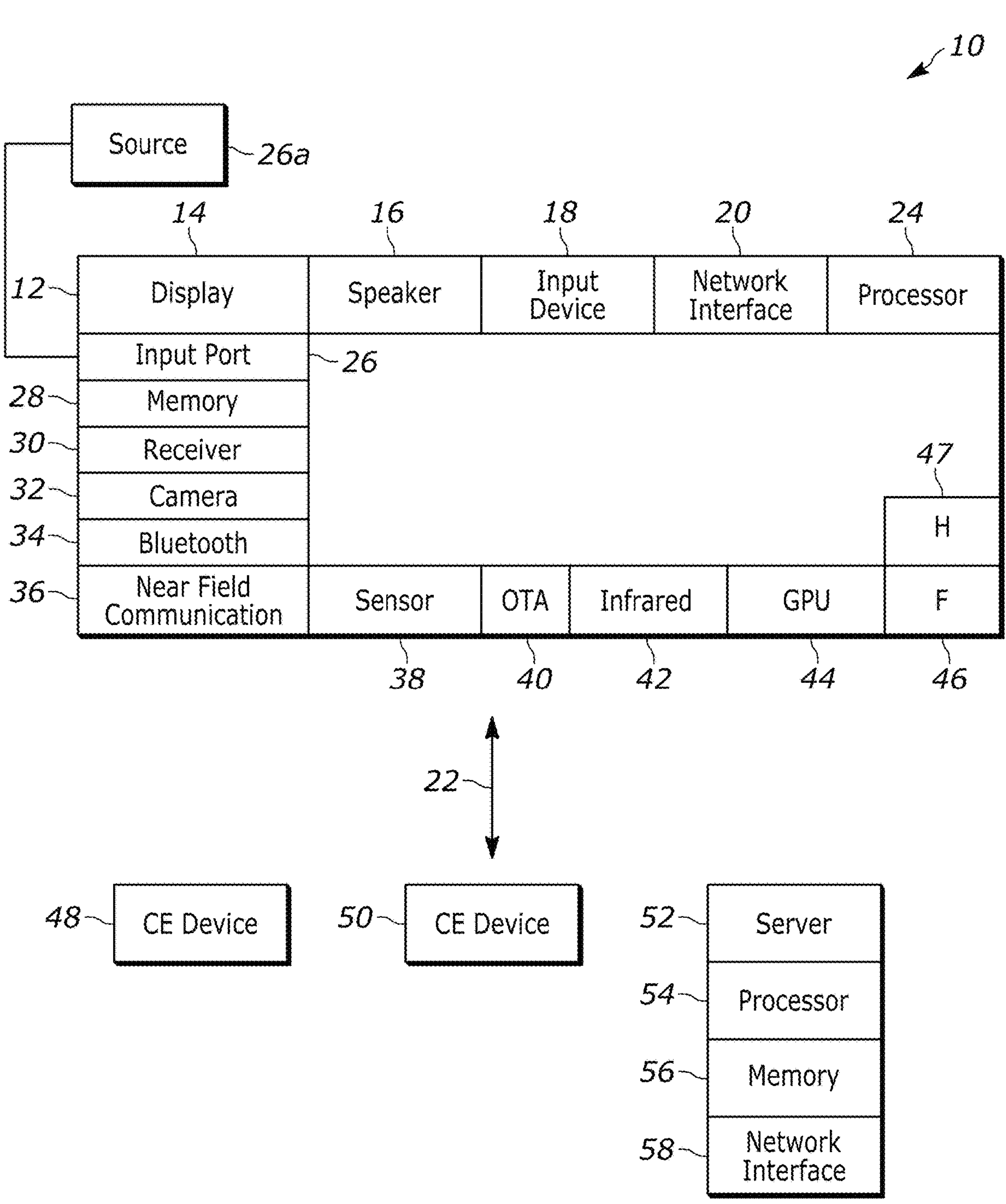
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the aforementioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Large language models (LLM) such as generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Techniques below may be implemented by a rules-based engine to produce the text/settings changes described per the corresponding features indicated by the eye tracking set forth, and/or by machine learning trained on the image data correlated to the rules below.

In brief overview, present principles contemplate an eye-tracker camera connected to a computer or reading device. Gaze data that can be derived from the image includes the reader's gaze position, gaze duration, pupil dilation, eye-openness, etc. The system then uses a reader's gaze data and in some embodiments machine learning techniques to detect patterns in the reading behavior. For example, the system can determine when a reader is going back in the text to re-read a portion, or if a reader has re-read a line multiple times, e.g., because a reader is distracted or because he is having difficulty understanding specific words in the line. The system can then adapt the text according to the reader's needs, by either simplifying the text in the line so it is clearly understood, or highlighting important words in a paragraph or line so that the reader can get the gist of what the text is trying to convey.

Figure 2:
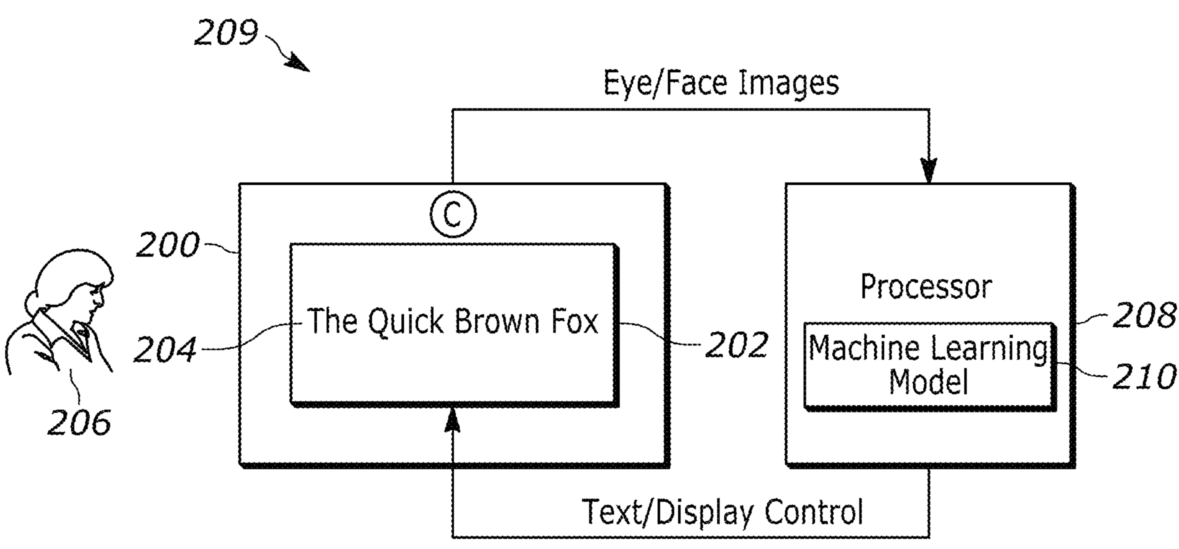
FIG. 2 illustrates an example specific system consistent with present principles.

With this overview in mind, an example system is shown in FIG. 2 in which a reading device 200 such as an e-book or other computing device presents on a display 202 text 204 of a book or story or news article or other tract. The example text used is "the quick brown fox jumped over the lazy dog". One or more cameras labeled "c" in FIG. 2 images a reader 206 of the text 204 as the reader is reading the text and sends eye/face images (generally, images from whence gaze or eye tracking data can be derived) to a processor system 208 that may execute a machine learning (ML) model 210 to produce output useful for text and/or display setting control on the display 202 based on the gaze or eye tracking data input to the ML model. Note that for each image, the location of the display at which the reader is looking and, hence, the text the reader is reading may accompany the image, a coupling that is facilitated by imaging the reader using the camera "c" that is part of the reading device and hence the images from which can be correlated to the text being read. Note further that all of the components shown in FIG. 2 may be embodied in a single reader device or may be distributed among plural devices.

Figure 3:
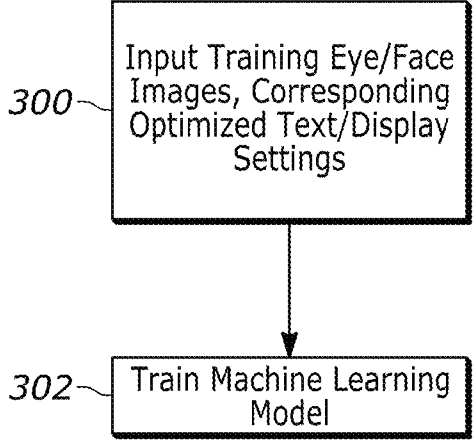
FIG. 3 illustrates example logic in example flow chart format for training a machine learning (ML) model.

FIG. 3 illustrates an example technique for training the ML model 210 shown in FIG. 2. Commencing at state 300, a training set of data is input to the ML model to train the model at state 302. The training set may include training images along with corresponding ground truth indications of what eye tracking the images represent and the corresponding changes indicated to be made to the text and/or display settings, such that the output of the ML directly indicates the display changes to be made. Or, the training set may simply include eye tracking data indicating the pose of eyes of readers along with corresponding ground truth changes indicated to be made to the text and/or display settings which conform to the rules discussed herein such that the output of the ML directly indicates the display changes to be made. Yet again, the training set may include training images along with corresponding ground truth indications of what eye tracking the images represent consistent with the gaze types described herein such that the output of the ML model indicates if the reader is squinting, skipping lines, etc. as set forth below and a table lookup then used to correlate that output to a display action. In any case, the output of the ML model is used to change the text and/or display settings according to the input data to the ML model.

Figure 4:
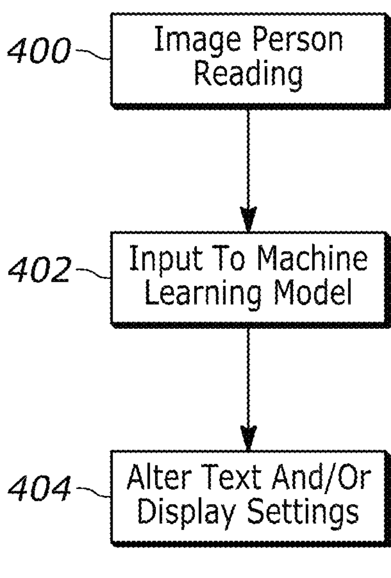
FIG. 4 illustrates example logic in example flow chart format for using the ML model trained according to FIG. 3 to alter text or display settings based on eye tracking of a person reading the text on the display.

FIG. 4 illustrates example overall logic when using a ML model. Commencing at state 400, a person reading text on an electronic display is imaged. Specifically, the person is imaged by one or more cameras to determine eye tracking and if desired eye/face pose. The eye tracking data embodied in the images is input at state 40 to the ML model 210 for example in FIG. 2 trained according to FIG. 3 to output information that may be used at state 404 in FIG. 4 to alter text being presented on the electronic display and/or to alter one or more display settings such as brightness.

Figure 5:
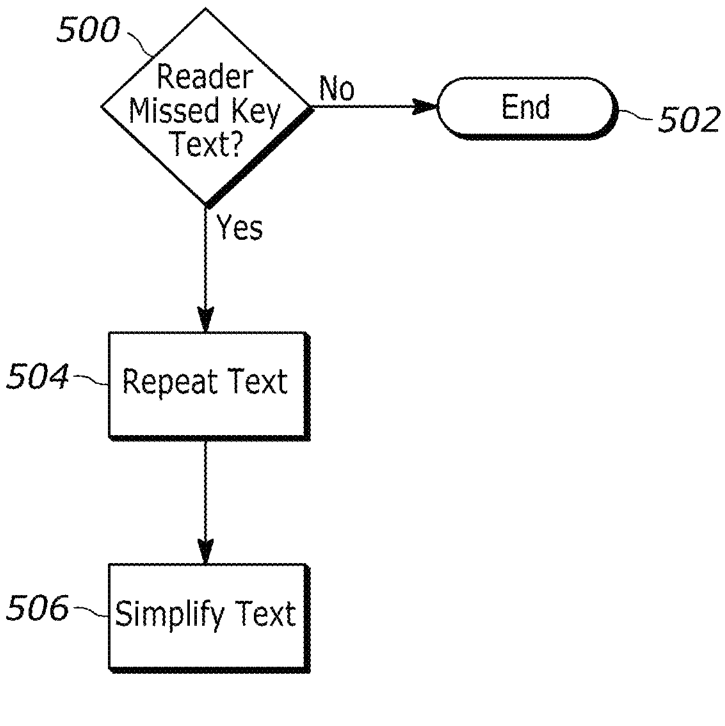
FIG. 5 illustrates example logic in example flow chart format illustrating a correlation between eye tracking data derived from eye tracking images of the person and altering text and/or display settings based thereon.
Figures 6, 7:
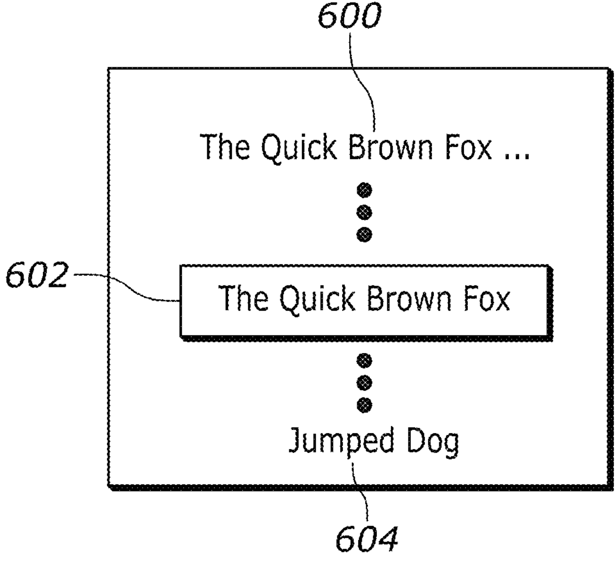
FIG. 6 illustrates an example screen shot consistent with FIG. 5.
FIG. 7 illustrates example logic in example flow chart format illustrating another correlation between eye tracking data derived from eye tracking images of the person and altering text and/or display settings based thereon.

With the above overview in mind, reference is now made to FIGS. 5 and 6. State 500 in FIG. 5 indicates whether the eye tracking data from the images at block 400 indicates that the reader missed text, referred to herein as "key" text. If not, the logic of FIG. 5 ends at state 502. Note that the negative branch of logic flow is not hereafter shown in ensuing flow charts. On the other hand, if the eye tracking data from the images at block 400 indicates that the reader missed text, the text may be repeated on the display at state 504. In addition or alternatively, at state 506 the text may be simplified.

FIG. 6 provides an illustration. Text 600 is presented on a display and assuming that the text shown has been missed (not read) by the reader prior to reading ensuing text, the text is repeated as shown in the window 602. Also, a simplified form of text, in this case, ensuing text, may be presented at 604, in which "jumped over the lazy dog" has been simplified to "jumped dog".

Thus, techniques herein may keep track of what the reader has read so far. If the reader has missed some key word or piece of text, the system repeats this information later in the text to ensure the reader understands it.

Figure 8:
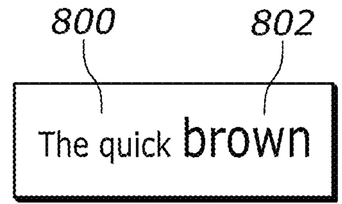
FIG. 8 illustrates an example screen shot consistent with FIG. 6.

Turn now to FIGS. 7 and 8. State 700 indicates that when the eye tracking data corresponds to a reader squinting as he reads, the size of the text may be automatically increased at state 702.

This is shown in FIG. 8, in which text 800 has been presented in a font having a first size and then, responsive to state 702 in FIG. 7, text 802 is presented in a larger font than the first size.

Figure 9:
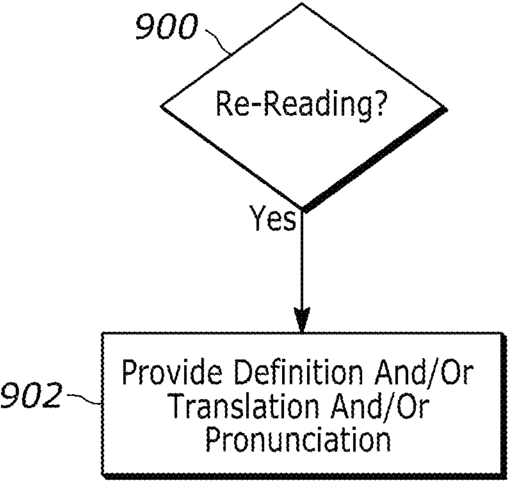
FIG. 9 illustrates example logic in example flow chart format illustrating yet another correlation between eye tracking data derived from eye tracking images of the person and altering text and/or display settings based thereon.
Figure 10:
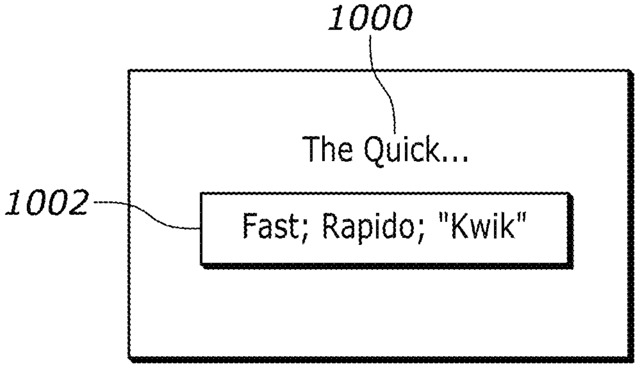
FIG. 10 illustrates an example screen shot consistent with FIG. 9.

FIGS. 9 and 10 relate to the case in which the eye tracking data corresponds to the reader is re-reading a particular word or phrase at state 900, possibly meaning that the reader does not know its meaning. In this case, the logic may move to state 902 to present the meaning of words or phrases in a pop-up that appears near the word/phrase. The logic also may present the word's pronunciation, and if the logic knows the reader is not reading his native language (using, for example, a user profile indicating such), a translation of the word may be presented.

FIG. 10 illustrates. Assume a reader re-read the word "quick" 1000. In response, in a window 1002 on the display one or more of a definition, translation, and phonetic pronunciation may be presented.

Figure 11:
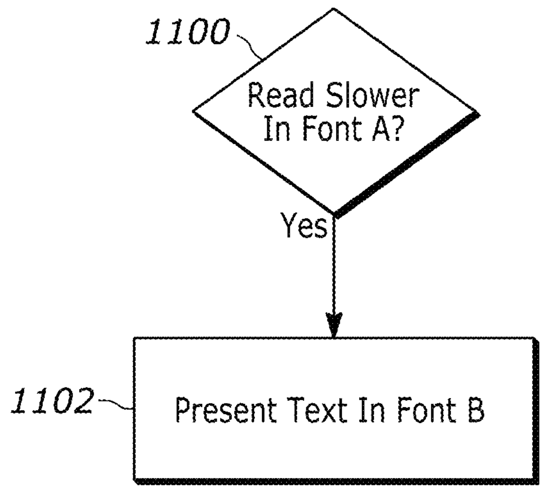
FIG. 11 illustrates example logic in example flow chart format illustrating still another correlation between eye tracking data derived from eye tracking images of the person and altering text and/or display settings based thereon.
Figure 12:
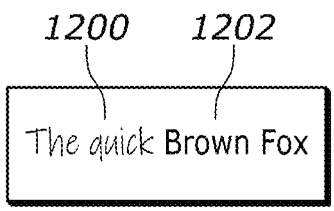
FIG. 12 illustrates an example screen shot consistent with FIG. 11.

FIGS. 11 and 12 relate to the case in which the eye tracking data corresponds to the reader reading slower at state 1100 when a first font ("A" in FIG. 11) is used but faster when a candidate second font ("B" in FIG. 11) is used. This may occur, for example, owing to dyslexia. In response, at state 1102 the logic automatically changes the font style of text that it gauges to be problematic for a reader by automatically changing any text in font A (shown at 1200 in FIG. 12) to font B (1202 in FIG. 12) instead.

Figure 13:
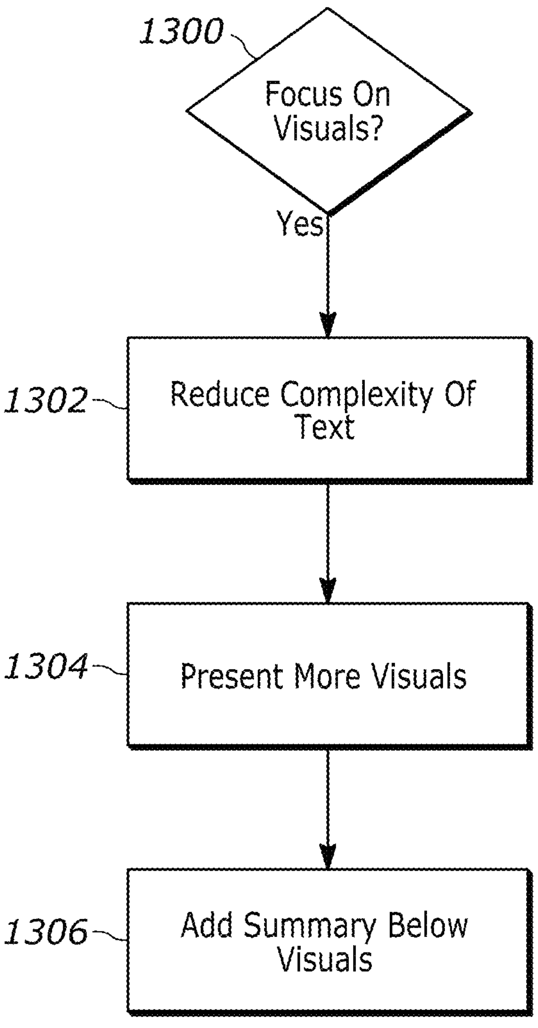
FIG. 13 illustrates example logic in example flow chart format illustrating another correlation between eye tracking data derived from eye tracking images of the person and altering text and/or display settings based thereon.
Figure 14:
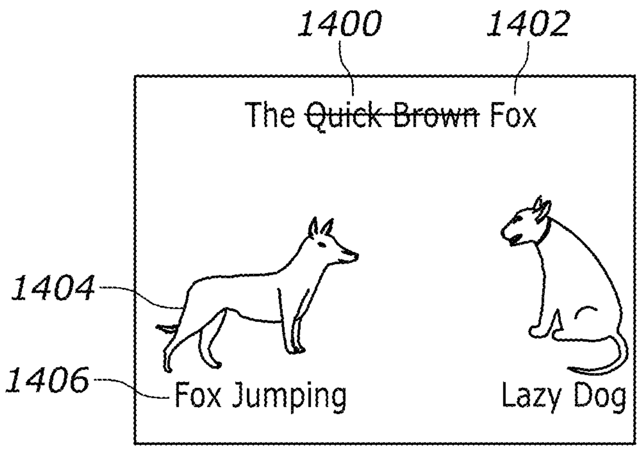
FIG. 14 illustrates an example screen shot consistent with FIG. 13.

FIGS. 13 and 14 relate to the case in which the eye tracking data corresponds to a reader dwelling longer on visual (non-text elements) on the display than on text at state 1300. In response, at state 1302 the logic may reduce the complexity of the text. In addition or alternatively, at state 1304 the logic may add in more visuals to the presentation such as by inputting text in the story to a generative pre-trained transformer and receiving back images described by the text. In addition or alternatively, at state 1306 the logic summarizes points in the text that are relevant to a visual and adds them, e.g., to the captions below a visual so that a reader is more likely to read them.

This is illustrated in FIG. 14, in which the phrase "The quick brown fox" has been simplified to "The fox" by eliminating the words shown at 1400 to leave the remaining words at 1402. Also, an image 1404 of a fox jumping has been supplemented with a description 1406 of what the image represents. Moreover, an image of a "lazy dog" has been added to the original presentation.

Figure 15:
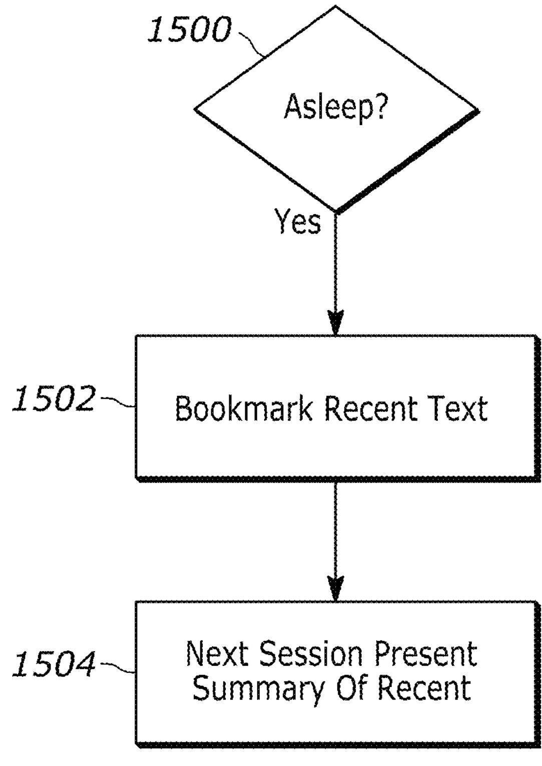
FIG. 15 illustrates example logic in example flow chart format illustrating a correlation between eye tracking data derived from eye tracking images of the person and altering text and/or display settings based thereon.
Figure 16:
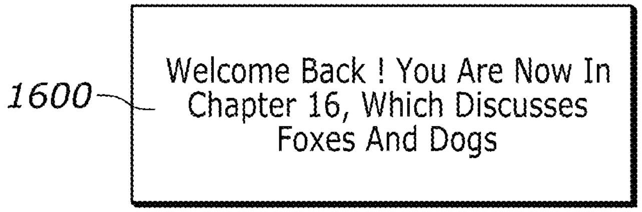
FIG. 16 illustrates an example screen shot consistent with FIG. 15.

FIGS. 15 and 16 relate to the case in which the eye tracking data corresponds to a reader falling asleep while reading at state 1500 (e.g., by using data from the degree and duration of eye openness or the number of blinks per second). In response, at state 1502 the logic adds a bookmark to the last (most recent) part of the text that the reader definitely read to make it easier for the reader to resume reading from the next session. At state 1504 the logic also presents summaries to the reader the next time the reader starts a reading session, so that the reader can recall what he has read before that point. Having an automatic bookmark in place may also be useful for people who have short attention spans and constantly move between reading a text, and doing some other task.

FIG. 16 illustrates. Assume an inattentive or sleepy reader is detected to resume reading in a subsequent session. At 1600 a short summary of what the reader last read when the eye tracking data indicated he was alert is presented.

Figure 17:
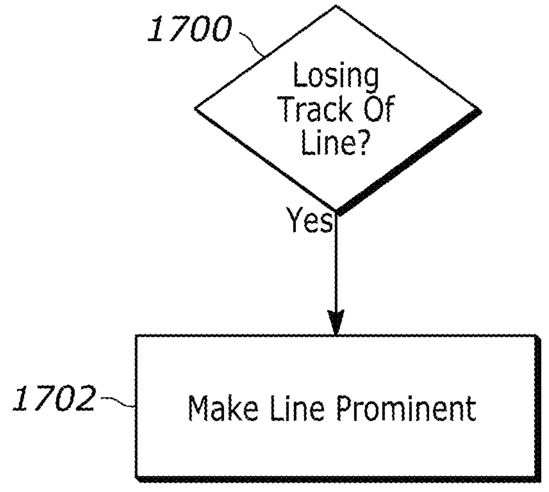
FIG. 17 illustrates example logic in example flow chart format illustrating a further correlation between eye tracking data derived from eye tracking images of the person and altering text and/or display settings based thereon.
Figure 18:
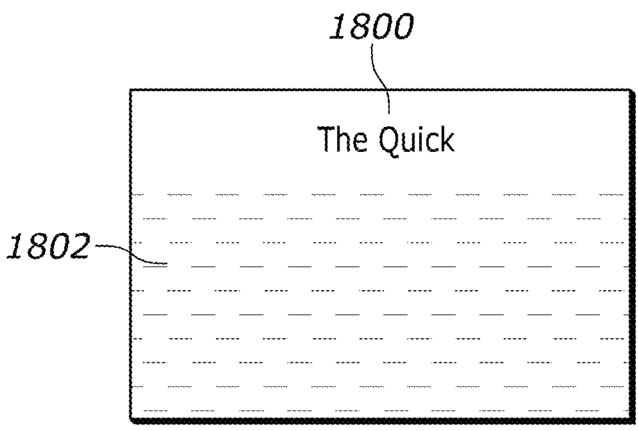
FIG. 18 illustrates an example screen shot consistent with FIG. 17.

FIGS. 17 and 18 relate to the case in which the eye tracking data corresponds to a reader losing track of the line he is currently reading at state 1700. In response, at state 1702 the line is made more visibly prominent, such as by reducing the brightness of the rest of the text and/or increasing the brightness of the line being read, so that the current line stands out from the remaining text on the display.

This is illustrated at 1800 in FIG. 18, in which the text is presented and as indicated at 1802 the brightness of the remaining portions of the display is reduced.

Figure 19:
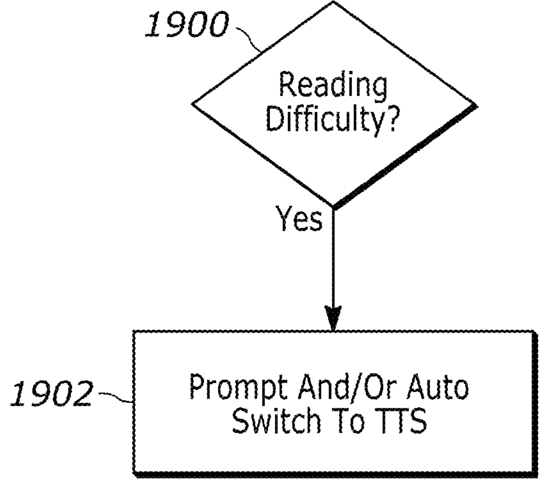
FIG. 19 illustrates example logic in example flow chart format illustrating a correlation between eye tracking data derived from eye tracking images of the person and altering text and/or display settings based thereon.
Figure 20:
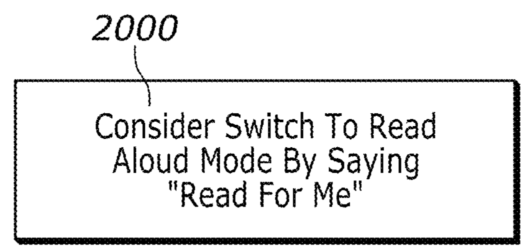
FIG. 20 illustrates an example screen shot consistent with FIG. 19.

FIGS. 19 and 20 relate to the case in which the eye tracking data corresponds to the reader experiencing difficulty in reading at state 1900 including that the reader is not reading at all. In response, at state 1902 a prompt may be display for the reader to turn on a "Read Aloud" feature that uses text to speech to read the text out loud.

FIG. 20 illustrates. At 2000 a prompt is presented on the display, audibly or as shown visibly, for the reader to switching to a read aloud mode.

While the particular embodiments are herein shown and described in detail, it is to be understood that the subject matter which is encompassed by the present invention is limited only by the claims.

What is claimed is:

1. An apparatus comprising:

one or more storage media storing instructions; and one or more processors configured to execute the instructions to cause the apparatus to perform operations comprising:

determining eye tracking data while text and a first non-text element are presented on a display;

determining, based on the eye tracking data, a focus on non-text elements; and altering the display responsive to the eye tracking data, wherein altering the display comprises:

presenting a textual language transformation on a portion of the text, wherein the textual language transformation comprises removing the portion of the text from the display; and presenting a second non-text element corresponding to the portion of the text that was removed.

2. The apparatus of claim 1, wherein the instructions cause the apparatus to perform operations further comprising:

inputting the eye tracking data to at least one machine learning (ML) model; and receiving from the ML model an indication of the altering.

3. The apparatus of claim 1, wherein the eye tracking data indicates a section of the text was missed, and the altering of the display further comprises repeating the missed text on the display at a different position on the display than where the missed text was originally displayed and at a position determined to be read subsequently.

4. The apparatus of claim 1, wherein the eye tracking data indicates a section of the text was missed, and the altering of the display further comprises simplifying the text missed on the display.

5. The apparatus of claim 1, wherein the eye tracking data indicates squinting, and the altering of the display further comprises increasing a size of the text on the display.

6. The apparatus of claim 1, wherein the eye tracking data indicates a section of the text was re-read, and the altering of the display further comprises presenting a definition of the section of the text that was re-read.

7. The apparatus of claim 1, wherein the eye tracking data indicates a section of the text was re-read, and wherein the textual language transformation comprises presenting a translation, from a first language to a second language, of the section of the text that was re-read.

8. The apparatus of claim 1, wherein the eye tracking data indicates a section of the text was re-read, and wherein the textual language transformation comprises presenting a pronunciation of the section of the text that was re-read.

9. The apparatus of claim 1, wherein the eye tracking data indicates a first font is read better than a second font, and the altering of the display further comprises switching presentation of the text from the first font to the second font.

10. The apparatus of claim 1, wherein the instructions cause the apparatus to perform operations further comprising responsive to the eye tracking data, presenting additional non-text elements on the display.

11. The apparatus of claim 1, wherein altering of the display further comprises presenting a summary of the text adjacent the non-text element.

12. The apparatus of claim 1, wherein the eye tracking data indicates a person is asleep, and the altering of the display further comprises presenting a summary of the text.

13. The apparatus of claim 1, wherein the eye tracking data indicates a line of the text was lost track of, and the altering the display further comprises rendering the line to be more prominent than other portions of the display.

14. The apparatus of claim 1, wherein the eye tracking data indicates difficulty reading a section of the text, and wherein instructions cause the apparatus to perform operations further comprising responsive to the eye tracking data, playing an audible version of the text on at least one speaker.

15. A device comprising:

at least one non-transitory computer-readable storage media storing instructions that, upon execution by one or more processors of the device, cause the device to:

determine eye tracking data while text and a first-non-text element are presented on a display;

receive, from at least one machine learning (ML) model and based on the eye tracking data, at least one output indicating a focus on non-text elements; and based at least in part on the output, alter the display, wherein altering the display includes:

presenting a textual language transformation on a portion of the text, wherein the textual language transformation comprises removing the portion of the text from the display; and presenting a second non-text element corresponding to the portion of the text that was removed.

16. A method, comprising:

generating eye tracking data while text and a first non-text element are presented on a display; and determining, based on the eye tracking data, a focus on non-text elements;

based at least in part on the eye tracking data, altering the display, wherein altering the text includes:

presenting a textual language transformation on a portion of the text, wherein the textual language transformation comprises removing the portion of the text from the display; and presenting a second non-text element corresponding to the portion of the text that was removed.

17. The method of claim 16, comprising:

inputting the eye tracking data to at least one machine learning (ML) model;

receiving output from the ML model;

using the output to lookup, in a data table, a display action; and executing the display action including changing a presentation of the text.

18. The method of claim 16, comprising:

based at least in part on the eye tracking data, changing at least one setting of the display other than the text.

* * * * *